(12) United States Patent
Cole

(10) Patent No.: US 7,748,155 B2
(45) Date of Patent: Jul. 6, 2010

(54) SYSTEMS AND METHODS APPLYING DENSITY ALTITUDE TO BALLISTIC TRAJECTORY COMPENSATION FOR SMALL ARMS

(76) Inventor: Brand D Cole, c/o Troutman Sanders LLP, 600 Peachtree St., Atlanta, GA (US) 30308

( * ) Notice: Subject to any disclaimer, the term of this patent is extended or adjusted under 35 U.S.C. 154(b) by 0 days.

(21) Appl. No.: 11/838,538

(22) Filed: Aug. 14, 2007

(65) Prior Publication Data

US 2008/0010891 A1     Jan. 17, 2008

Related U.S. Application Data

(63) Continuation-in-part of application No. 11/313,764, filed on Dec. 22, 2005, now Pat. No. 7,325,353.

(60) Provisional application No. 60/683,546, filed on May 20, 2005.

(51) Int. Cl.
  *F41G 1/38* (2006.01)
  *F41G 1/473* (2006.01)
  *F41G 3/08* (2006.01)
(52) U.S. Cl. .......................... 42/130; 42/119
(58) Field of Classification Search ................. 42/111, 42/119, 122, 130, 131, 142; 33/265; D22/109; D16/132; 235/404–406
See application file for complete search history.

(56) References Cited

U.S. PATENT DOCUMENTS

| | | |
|---|---|---|
| 1,107,163 A | 8/1914 | Grauheding |
| 1,127,230 A | 2/1915 | Grauheding |
| 1,190,121 A | 7/1916 | Critchett |
| 2,154,454 A | 4/1939 | Joyce |
| 3,682,552 A | 8/1972 | Hartman |
| 3,782,822 A | 1/1974 | Spence |
| 3,948,587 A | 4/1976 | Rubbert |
| 4,263,719 A | 4/1981 | Murdoch |
| 4,531,052 A | 7/1985 | Moore |
| D306,173 S | 2/1990 | Reese |
| 5,223,650 A | 6/1993 | Finn |
| 5,491,546 A | 2/1996 | Wascher et al. |
| 5,657,571 A | 8/1997 | Peterson |

(Continued)

OTHER PUBLICATIONS

"http://www.notpurfect.com/main/sighs.htm", printed Apr. 26, 2005, discussion of sights, range estimating scopes, the mil-dot system, etc., 5 pp.

(Continued)

*Primary Examiner*—Bret Hayes
(74) *Attorney, Agent, or Firm*—Troutman Sanders LLP; James H Yancey, Jr.

(57) ABSTRACT

Systems and methods applying density altitude to ballistic trajectory compensation for small arms are provided. According to some embodiments, systems to solve ranging and ballistic compensation problems in firearms at various range-distances under varying atmospheric conditions are provided. Such systems can comprise a reticle housed within a firearm scope; and ballistic compensation information associated with at least one of the reticle and an aimpoint adjustment feature of the firearm. A user can utilize the ballistic compensation information to compensate for various density altitude levels to adjust the firearm scope. The ballistic compensation information can be indexed by density altitude level to enable adjustment of the firearm scope to adjust for varying atmospheric conditions and range distances. Other aspects, features, and embodiments are also claimed and described.

16 Claims, 11 Drawing Sheets

U.S. PATENT DOCUMENTS

| | | |
|---|---|---|
| D397,704 S | 9/1998 | Reese |
| 5,920,995 A | 7/1999 | Sammut |
| 5,960,576 A | 10/1999 | Robinson |
| 6,032,374 A | 3/2000 | Sammut |
| 6,269,581 B1 | 8/2001 | Groh |
| 6,453,595 B1 | 9/2002 | Sammut |
| 6,516,699 B2 | 2/2003 | Sammut et al. |
| 6,591,537 B2 | 7/2003 | Smith |
| 6,729,062 B2 | 5/2004 | Thomas et al. |
| 7,325,353 B2 * | 2/2008 | Cole et al. .................... 42/119 |
| 2006/0260171 A1 * | 11/2006 | Cole et al. .................... 42/122 |

OTHER PUBLICATIONS

"http://www.klomont.com/specs.htm", printed Apr. 26, 2005, discussion of the "Nightforce" illuminated mil-dot reticle, 3 pages.

"http://www.leupold.com/products/reticles.htm", printed Apr. 26, 2005, drawings and discussion of a series of different scope reticle patterns, 4 pp.

* cited by examiner

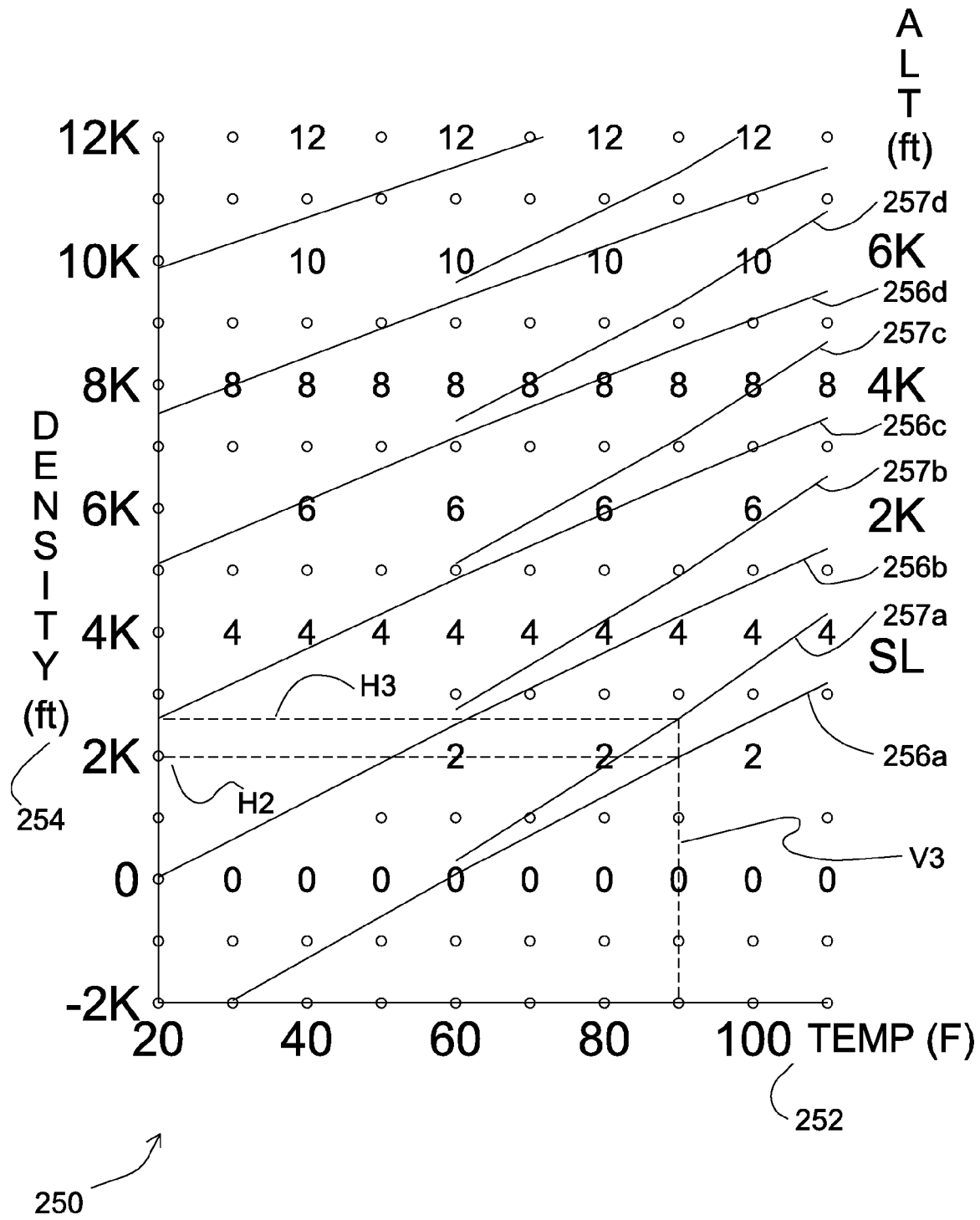
Fig. 6-B

1 / 4 MOA
10-A

1 / 2 MOA
10-B

3 / 4 MOA
10-C

1 MOA
10-D

2 MOA
10-E

3 MOA
10-F

4 MOA
10-G

5 MOA
10-H

6 MOA
10-I

1 - 1 / 4 MOA
10-J

2 - 1 / 2 MOA
10-K

4 - 3 / 4 MOA
10-L

SYSTEMS AND METHODS APPLYING DENSITY ALTITUDE TO BALLISTIC TRAJECTORY COMPENSATION FOR SMALL ARMS

CROSS REFERENCE TO RELATED APPLICATION & PRIORITY CLAIMS

This patent application is a continuation-in-part of U.S. Non-Provisional patent application Ser. No. 11/313,764, filed on 22 Dec. 2005, which claims priority to and the benefit of U.S. Provisional Application No. 60/683,546, filed on 20 May 2005. Each of these applications is hereby incorporated by reference herein as if fully set forth below.

TECHNICAL FIELD

Embodiments of the present invention relate generally to systems and devices for resolving factors affecting the trajectory of a bullet fired from a firearm. More specifically, embodiments of the present invention relate to nomographs and charts that provide solutions for factors involved in the ballistic flight of a bullet or projectile, including elevation, windage, slope, and atmospheric conditions such density altitude.

BACKGROUND

Virtually all persons engaged in firearm shooting, whether hunting or target shooting, are well aware of at least some of the basic factors affecting the accuracy of a shot. The primary factors affecting shooting accuracy are the range or distance to the target and resulting arcuate trajectory (drop) of the bullet, and windage or lateral drift due to wind. The need to correct for these two factors is well known.

However, there are several other factors which result in lesser errors in shooting. Nevertheless, it is critical that these other factors be taken into consideration and compensated for, to produce an extremely accurate shot. These factors are especially critical at long ranges, i.e. approaching or over one thousand yards.

One factor which appears fairly often in the field is slope. The difference in elevation between the firearm and the target can result in significant error, depending upon the elevation difference and the range of the shot. While various corrections have been developed for most of these factors, most such corrections have been provided in the form of mathematical equations, the solution of which is left to the user's discretion as to how to accomplish the mathematics.

Other factors are atmospheric variables, specifically altitude and barometric pressure, temperature, and humidity. These variables have traditionally been utilized to alter the ballistic coefficient (BC) of a projectile for specific atmospheric conditions prior to calculating the trajectory. BC is a scaling factor against a well-known, standard projectile. These atmospheric variables all affect the aerodynamic drag on the projectile, thus altering the trajectory.

Certain telescopic firearm sight reticles have been developed in the past, with various markings to assist the shooter in determining the apparent range of a target. A nearly universal system has been developed by the military for artillery purposes, known as the "mil-radian," or "mil," for short. This system has been adopted by most of the military for tactical (sniper) use, and subsequently adopted by most of the sport shooting world. The mil is an angle having a tangent of 0.001. This provides a means of measuring the distance to a target in terms of apparent target height or span (or height or span of a known object in the vicinity of the target). For example, a target distance of one thousand yards would result in one mil subtending a height of one yard, or thirty six inches, at the target. This is about 0.058 degree, or about 3.5 minutes of angle. It should be noted that although the term "mil-radian" implies a relationship to the radian, the mil is not exactly equal to an angle of one thousandth of a radian, which would be about 0.057 degree or about 3.42 minutes of angle. The "mil-dot" system, based upon the mil, is in wide use in scope reticle marking, but does not provide any means per se of determining the distance to a target without having at least a general idea of the target size, and performing a mathematical calculation involving these factors.

Another angular measurement system used in shooting is known as the "minute of angle," or MOA. This system measures the height or distance subtended by an angle of one minute, or one sixtieth of a degree. At a range of one hundred yards this subtended span is slightly less than 1.05 inches, or about 10.47 inches at one thousand yards range. It will be seen that the distance subtended by the MOA is substantially less than that subtended by the mil at any given distance, i.e. thirty six inches for one mil at one thousand yards but only 10.47 inches for one MOA at that range.

Both of the above described systems are in use for scope reticle marking, and either may be incorporated with the present nomograph system. Both are angular measurements, however, they require that some dimension of the target (or object near the target) be known in order to determine the distance to the target by means of the mil or MOA angular systems.

In addition to the above general knowledge of the field of the present invention, the present inventor is also aware of certain foreign references:

Japanese Patent Publication No. 55-36,823 published on Mar. 14, 1980 to Raito Koki Seisakusho KK describes (according to the drawings and English abstract) a variable power rifle scope having a variable distance between two horizontally disposed reticle lines, depending upon the optical power selected. The distance may be adjusted to subtend a known span or dimension at the target, with the distance being displayed numerically on a circumferential external adjustment ring. A prism transmits the distance setting displayed on the external ring to the eyepiece of the scope, for viewing by the marksman.

German Patent Publication No. 3,401,855 published on Jul. 25, 1985 to Carl Walther GMBH describes (according to the drawings and English abstract) a toroidal ring attached to the eyepiece end of a firearm scope, with the ring being half filled with a highly visible liquid. Aligning the liquid level with the ends of the horizontal stadia of the reticle, assures that the firearm scope is leveled axially.

German Patent Publication No. 3,834,924 published on Apr. 19, 1990 to Siegfried Trost describes (according to the drawings and English abstract) a scope leveling device similar to that of the '855 German Patent Publication noted immediately above, but containing a weight in a semicircular tubular segment, rather than a liquid in a toroidal ring.

Given certain existing drawbacks, what is needed, therefore, are new systems and devices for resolving factors affecting the trajectory of a bullet fired from a firearm. It is to the provision of such nomographs and charts that provide solutions for factors involved in the ballistic flight of a bullet or projectile that the various embodiments of the present invention are directed.

BRIEF SUMMARY

According to some embodiments of the present invention, a multiple nomograph system can generally comprise a reticle disposed within a firearm scope. Also, horizontal and vertical angular measurement stadia can be disposed upon the reticle along with a distance v. angular measurement nomograph, corresponding to the horizontal and vertical angular measurement stadia. The system can also include a density altitude nomograph. At least one of the distance v. angular measurement nomograph and the density altitude nomograph can be disposed externally to the firearm scope in some embodiments. Also, the density altitude nomograph can comprise a density altitude determination chart and a density altitude ballistic correction nomograph.

A multiple nomograph system according to other embodiments of the present invention can include other features. For example, a system can include an elevation and windage aim point field disposed upon the reticle. The elevation and windage aim point field can comprise a multiple point elevation and multiple windage aim point field. Also, a system can include a density altitude determination chart. And according to some embodiments, a system can comprise one or more markings disposed on the reticle of the scope, and the markings can contain encoded density altitude information. This advantageous feature enables presentation of density altitude information on the reticle of a scope.

Embodiments of the present invention provide multiple nomograph systems for solving ranging and ballistic problems in firearms that enable marksmen to rapidly determine the solutions for a number of factors affecting the ballistic flight of a bullet, without need for mathematical calculations or electronic devices. Embodiments of the present invention may be displayed upon the reticle of a firearm scope, allowing the marksman to keep his eye on the scope sight at all times. Alternatively, graphs may be presented on a medium external to the scope, if so desired. While shooters may wish to use other means to solve the various problems associated with the trajectory of a bullet, e.g. logbooks or records of previous experiences or an electronic computer program, embodiments of the present system can enable a marksman to quickly and easily solve firearm ballistic problems without need of electronic devices and/or cumbersome logbooks or similar records.

Other embodiments can include a firearm scope reticle marked in mil-radians, minutes of angle, or other marking system as desired. Separate stadia are provided with the reticle, allowing the marksman to gauge the angle subtended by an object (target, etc.) of known size to determine the apparent distance to the target. A separate nomograph (either within the scope reticle, or external to the scope) is provided for the marksman to determine the range to the object of known size. Lateral markings are provided for windage and target lead. Additional nomographs are provided for the determination of slope, i.e. difference in elevation between the firearm and the target, and density altitude. The slope graph component of the present invention is also useful for determining the direct crosswind component for wind crossing the flight path of the bullet at an oblique angle. The present multiple nomograph system could also be used to compensate for additional factors as well, e.g. Coriolis effect, with additional input such as latitude and direction of aim.

The inventor has developed a methodology of using the concept of density altitude for use as a single variable to replace the conventionally utilized three variables comprising altitude (barometric pressure), temperature, and humidity. This concept provides powerful simplification in that it allows a single standard trajectory to be calculated or developed, and then provide for the determination of simple adjustments to be made to that trajectory (by means of density altitude correction graphs) for various density altitudes. This is in contrast to the conventional ballistic calculations whereby the atmospheric variables are used to "correct" the ballistic coefficient (BC) of the projectile prior to calculating the trajectory. Thus, conventionally, the complex and time-consuming trajectory calculation had to be made any time an atmospheric variable changed. The difficulty of this conventional method generally kept discussion of changes resulting from atmospheric changes to a "qualitative" discussion, whereas the method of the present invention provides a quantitative consideration of the factors involved.

Other aspects and features of embodiments of the present invention will become apparent to those of ordinary skill in the art, upon reviewing the following description of specific, exemplary embodiments of the present invention in conjunction with the accompanying figures.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings showing embodiments of the present invention.

FIGS. 6 and 6B are detailed views of a nomograph for the determination of density altitude, for placement either on the scope reticle or external to the reticle, according to some embodiments of the present invention.

Figure 1:
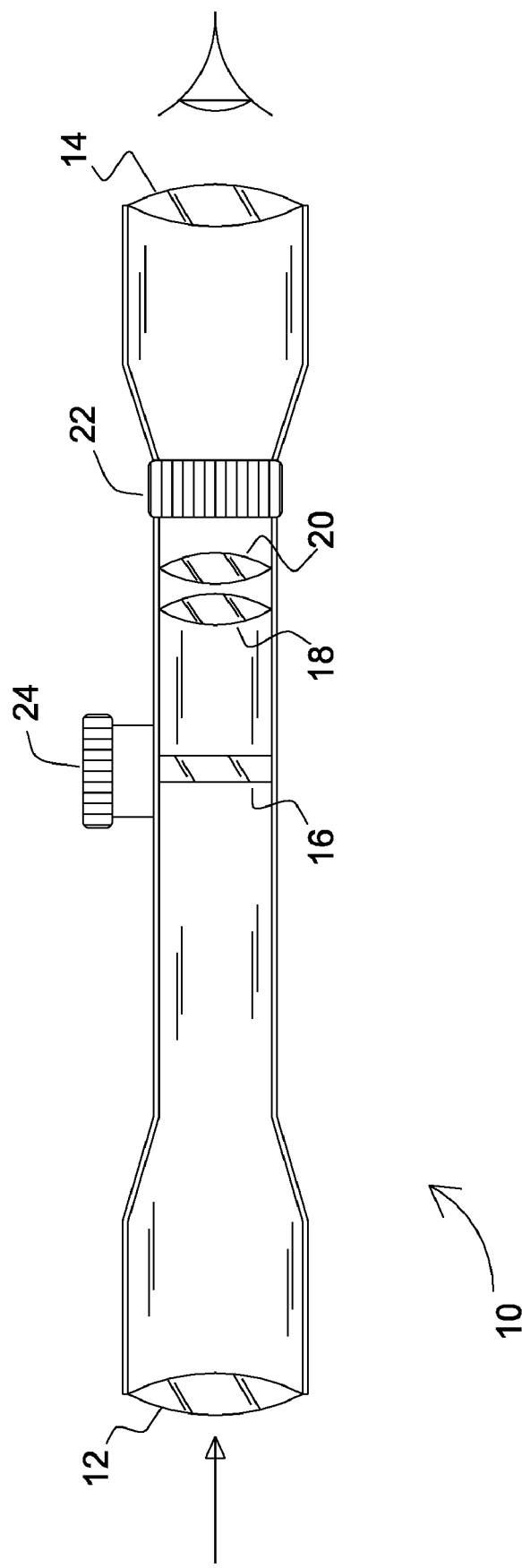
FIG. 1 is a side elevation view in section of a variable power telescopic sight incorporating a reticle according to some embodiments of the present invention.

The detailed description explains preferred and alternative embodiments of the invention, together with advantages and features, by way of example with reference to the drawings.

DETAILED DESCRIPTION OF PREFERRED & ALTERNATIVE EMBODIMENTS

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented.

Embodiments of the present invention comprise a multiple nomograph system for solving ranging and ballistic problems in firearms, and are adapted particularly for use with hand held firearms having magnifying scope sights. Also, embodiments of the present system comprise a series of nomographs or charts in combination with an aiming point or field disposed upon a firearm scope reticle, with the various nomographs or charts providing graphical solutions for ballistic problems such as elevation (bullet drop), windage, differential slope between the firearm and target, and density altitude (air density).

FIG. 1 provides a side elevation view in section of an exemplary variable power firearm scope or telescopic sight 10, with which embodiments of the present invention may be used. The scope 10 generally includes an objective lens 12 and ocular or eyepiece lens 14 at opposite ends of the device, with a reticle screen or glass 16 disposed therebetween. Variable power scopes also include an erector lens 18 and power adjustment (zoom) lens 20, with some means for adjusting the relative position of the zoom lens 20 to adjust the magnification power as desired, e.g. a circumferential adjustment ring 22 which threads the zoom lens 20 toward or away from the erector lens 18. Variable power scopes 10, as well as other types of telescopic sight devices, also often include a control 24 for adjusting the reticle screen 16 and position of the aiming point or center of the aim point field thereon (or adjusting the alignment of the scope 10 with the firearm), to adjust for elevation (bullet drop) as desired. Scopes also conventionally include a windage adjustment control as well.

While an exemplary conventional variable power scope 10 is used in the illustrations, it will be understood that the present system may be used with other types of scopes in lieu of the variable power scope 10. For example, fixed power scopes are often used by many hunters and target shooters. Such fixed power scopes have the advantages of economy, simplicity, and durability, in that they eliminate at least one lens and a positional adjustment for that lens. Such a fixed power scope may be suitable for many marksmen who generally shoot at relatively consistent ranges and targets. More recently, digital electronic scopes have been developed, which operate using the same general principles as digital electronic cameras. Embodiments of the present invention may be employed with these other types of scopes, as well as with the variable power scope 10 of FIG. 1.

Variable power scopes generally include two focal planes. The reticle screen or glass 16 for the present multiple nomograph system is preferably positioned at the first or front focal plane between the objective lens 12 and erector lens 18, in order that the reticle thereon will change scale correspondingly with changes in magnification as the power of the scope is adjusted. This results in reticle divisions subtending the same apparent target size or angle, regardless of the magnification of the scope. In other words, a target subtending two reticle divisions at a relatively low magnification adjustment, will still subtend two reticle divisions when the power is adjusted, to a higher magnification, at a given distance from the target. This reticle location is preferred for the present system when used in combination with a variable power firearm scope.

A reticle screen may be placed at the second or rear focal plane between the zoom lens 20 and eyepiece 14, however, if so desired. Such a second focal plane reticle will remain at the same apparent size regardless of the magnification adjustment to the scope, which has the advantage of providing a full field of view to the reticle at all times. The reticle divisions will not consistently subtend the same apparent target size with changes in magnification, however, when the reticle is positioned at the second focal plane in a variable power scope. Accordingly, it is preferred according to some embodiments that the present system be used with first focal plane reticles in variable power scopes, due to the difficulty in using such a second focal plane reticle in a variable power scope.

Figure 2:
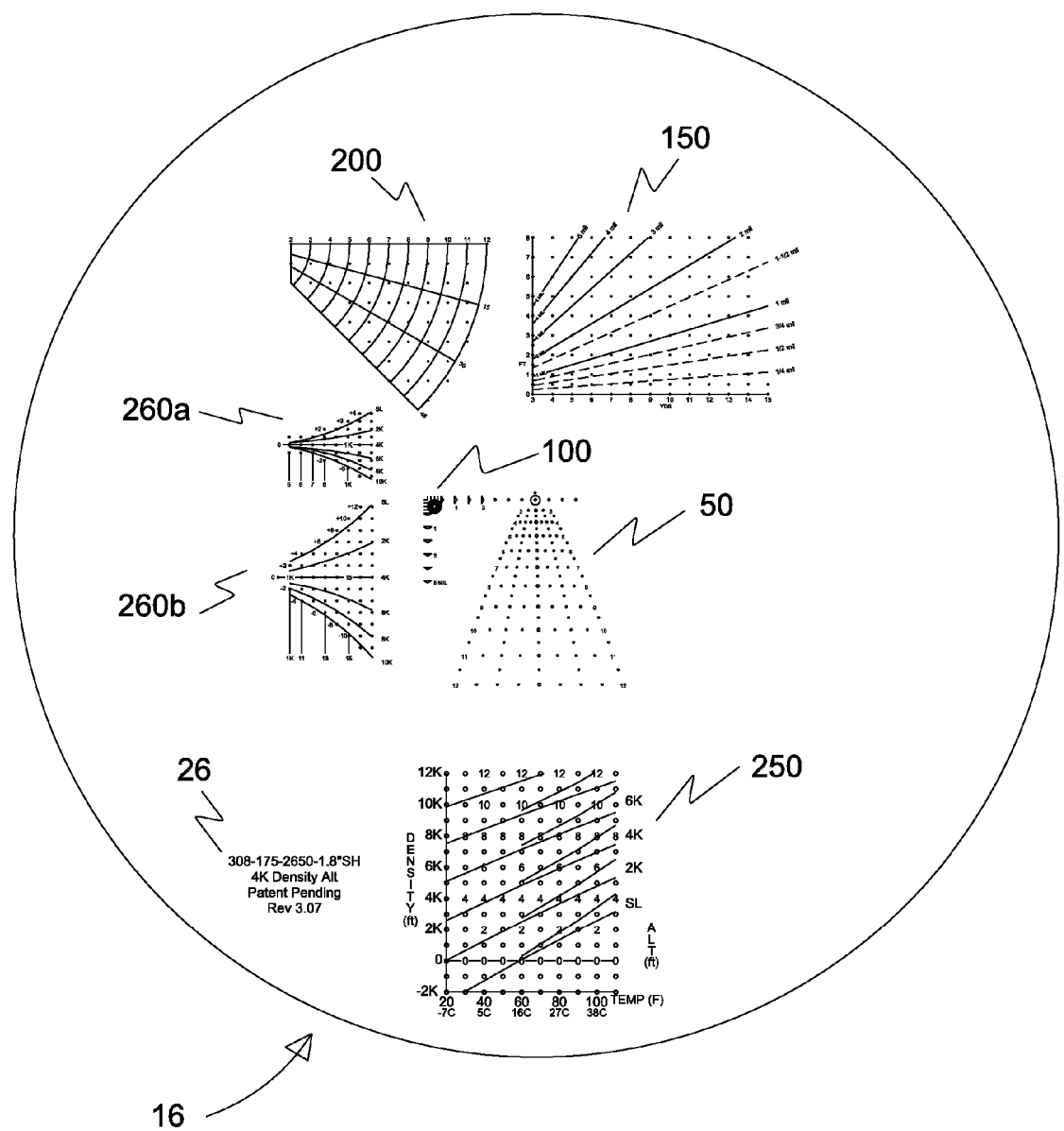
FIG. 2 is a sight picture of a firearm scope reticle incorporating a series of nomographs and other features according to some embodiments of the present invention.

FIG. 2 provides an exemplary sight picture of a reticle screen or glass 16 incorporating nomographs and aiming points or fields according to some embodiments of the present invention. It will be seen that the multiple nomographs of the present system will only be valid for a specific ballistic flight path or trajectory for a bullet or other projectile. The nomographs and fields comprise an elevation and windage aim point field 50; horizontal and vertical angular measurement stadia 100; a distance v. angular measurement nomograph 150, corresponding to the angular measurement stadia 100; a slope and wind correction nomograph 200; and a density altitude determination chart 250 and a set of density altitude ballistic correction nomographs 260a and 260b. The scale of these nomographs 50 through 260 is relatively small, as would be the case at a relatively low magnification power in a variable power scope. However, FIGS. 3 through 7 provide enlarged views of each of the nomographs of FIG. 2, as they would appear under higher magnification when the reticle screen 16 is positioned at the first focal point of the scope.

The flight path or trajectory is also affected by a number of additional factors, including the ballistic coefficient (BC) of the projectile, the muzzle velocity (MV), and atmospheric conditions. Accordingly, a set of nomographs constructed in accordance with the present invention will be precisely valid for one, and only one, combination of such factors, but usable across a spectrum of similar variables. A legend 26 may be provided at some point in the reticle field 16, as shown in FIG. 2, and/or with other separate nomograph sheets or displays, for the marksman to correlate the appropriate nomographs with the corresponding firearm and ammunition.

It will also be seen that with the exception of the elevation and windage aim point field 50 and horizontal and corresponding vertical angular measurement stadia 100, all other nomographs and charts may be disposed externally to the viewing field or reticle of the firearm scope, if so desired. For example, they may be placed on paper (generally as presented in FIGS. 4 through 7) or plastic sheet media, or disposed in a spotting scope or device separate from the firearm scope, if so desired. The advantage of placing all of the aim points, fields, nomographs, and charts 50 through 260 on the scope reticle 16 is that a single marksman may view and utilize all of these components in calculating the aiming point to be used for the target, without removing his eye from the target being viewed through the scope. Also, while embodiments of the present system may be used in combination with electronic viewing and calculating means, it is not electronic per se, and does not require the use of electronic optical or calculating devices. This can be a definite advantage in the field, where any problems occurring with such electronic devices are unlikely to be solvable.

Figure 3:
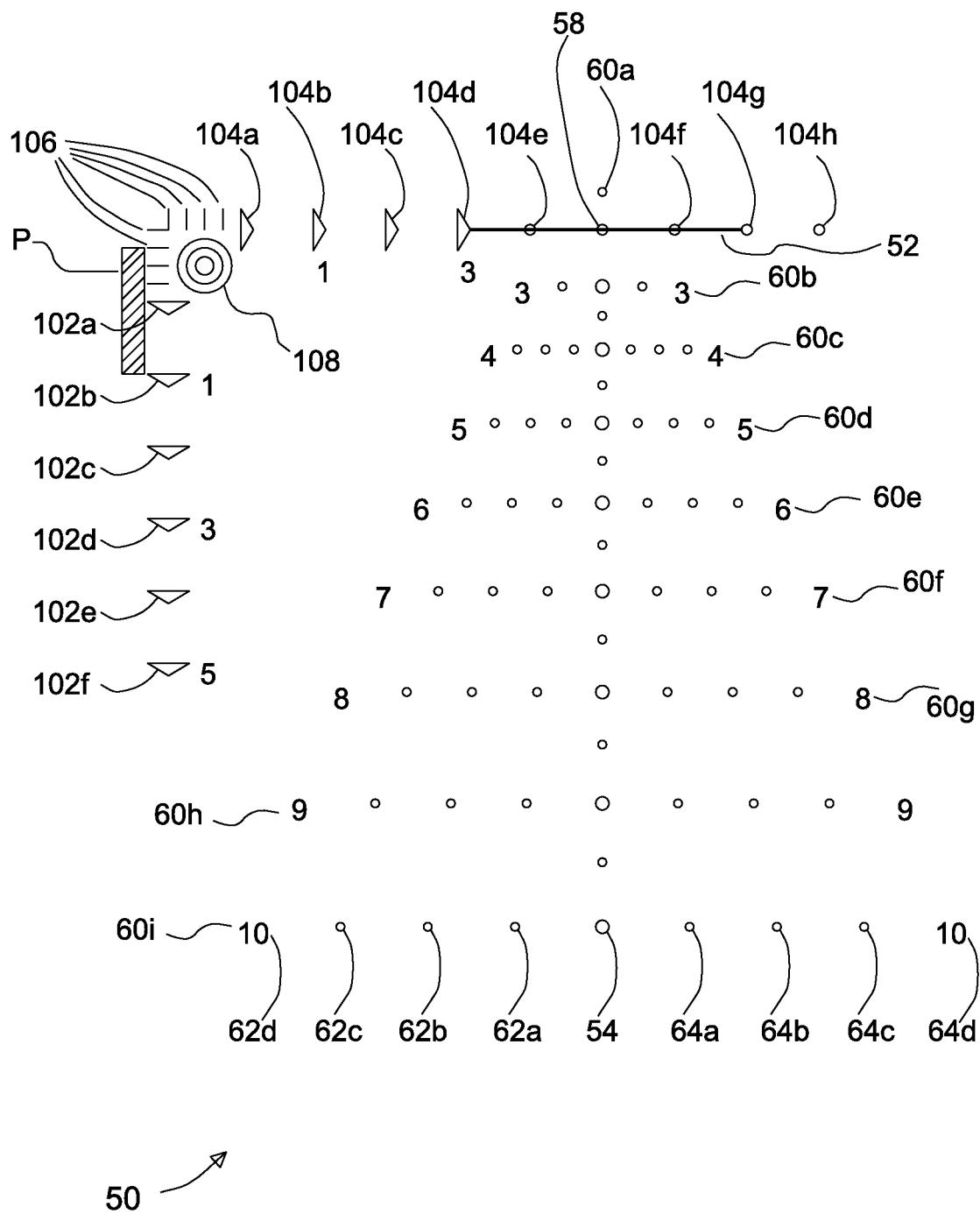
FIG. 3 is a detailed view of a target aiming field or dot pattern and apparent target angular dimension stadia placed on the scope reticle and used in accordance with some embodiments of the present multiple nomograph invention.

FIG. 3 provides a detailed view of an exemplary elevation and aim point field 50, with accompanying horizontal and vertical angular measurement stadia 100 (102, 104, 106, and 108). The aim point field 50 must be located on the scope reticle, as the marksman uses the aim point field 50 for aiming at the target as viewed through the scope and reticle. The aim point field comprises at least one aiming mark 58, and typically also a horizontal crosshair line 52 and vertical crosshair line represented here by the column of aiming dots 54.

Embodiments of the present multiple nomograph system can be operable with a scope reticle having such a single aim point 58, but greater utility is provided by means of a multiple aim point field such as the aim point field 50 shown in detail in FIG. 3. The multiple aim point field 50 is formed of a series of horizontal rows of aiming dots 60a, 58, 60b, 60c, etc. and vertically disposed. It will be noted that the uppermost rows comprise but a single aim point dot as they are situated for close range at, in this example, 100 and 200 yards respectively. Most of these rows of aiming dots are numbered to provide ready reference for the yardage they are to be used at, "3" (60b) indicating 300 yards, "4" (60c) indicating 400 yards, etc. It will be noted the vertical spacing of these rows increase with increasing distance as is typical in a ballistic trajectory for uniformly spaced range distances. The alignment and spacing of these rows is set up to properly account for trajectory changes.

In a similar manner, the generally vertical columns 62a, 62b, etc and 64a, 64b, etc., spread as they extend downwardly to greater ranges. These generally vertical columns compensate for windage, i.e. the lateral drift of a bullet due to a crosswind component. A crosswind will have an ever greater effect upon the path of a bullet with longer and longer ranges or distances. Accordingly, the vertical columns spread with greater range, with the two inner columns 62a, and 64a being spaced to provide correction for a five mile per hour crosswind component, the next two adjacent columns 62b, 64b providing correction for a ten mile per hour crosswind component, etc. These windage dots may be set for any value or units the user deems appropriate.

To use the above described elevation and windage aim point field 50, a marksman must have a reasonably close estimate of the range to the target. This can be provided by means of the evenly spaced horizontal and vertical angular measurement stadia 100 disposed upon the reticle field 16 along the aim point field 50. The stadia 100 comprises a vertical row of stadia alignment markings 102a, 102b, etc., and a horizontal row of such markings 104a, 104b, etc. It will be noted that the horizontal markings 104a, 104b, etc. are disposed along the horizontal reference line or crosshair 52, but this is not required. Indeed, the horizontal marks could be placed at any convenient location on the reticle as desired.

Each adjacent mark, e.g. vertical marks 102a, 102b, etc. and horizontal marks 104a, 104b, etc., are evenly spaced from one another and subtend precisely the same angle therebetween, e.g. one mil, or a tangent OF 0.001. Other angular definition may be used as desired; for example, the minute of angle or MOA system discussed above. Any system for defining relatively small angles may be used, so long as the same system is used consistently for both the stadia 100 and the distance v. angular measurement nomograph 150.

The stadia system 100 is used by estimating some dimension of the target, or an object close to the target. For example, a hunter may note that the game being sought is standing near a fence line having a series of wooden fence posts. The hunter recognizes that the posts are about four feet tall, from prior experience. Alternatively, he could estimate some dimension of the game, e.g. height, length, etc., but larger dimensions, e.g. the height of the fence post, are easier to gauge accurately. The hunter places the top of post P, shown to the left of vertical stadia markings 102a, 102b, within the fractional mil marks 106 of the stadia 100, and adjusts the alignment of the firearm and scope vertically to place the base of the post P upon a convenient integer alignment mark, e.g. the second mark 102b.

The hunter then reads the angular subtension of post P to span one and three quarter mils, with the base of post P resting on the one mil mark 102b and the top of the post extending to the third of the quarter mil marks 106. Finer resolution of the angle may be achieved by comparing the top of post P (or other object) with the one eight mil "bulls-eye" 108 located within the quarter mil marks 106. It should be noted that the "bulls-eye" 108 is not an aiming point, but rather a fractional mil angular scale used with the fractional horizontal and vertical angular measurement stadia 106. The horizontal mil marks 104a, 104b, etc. along with central aim point 58, positioned between the two horizontal marks 104e and 104f, are used similarly for determining a horizontal angle subtended by an object.

Figure 4:
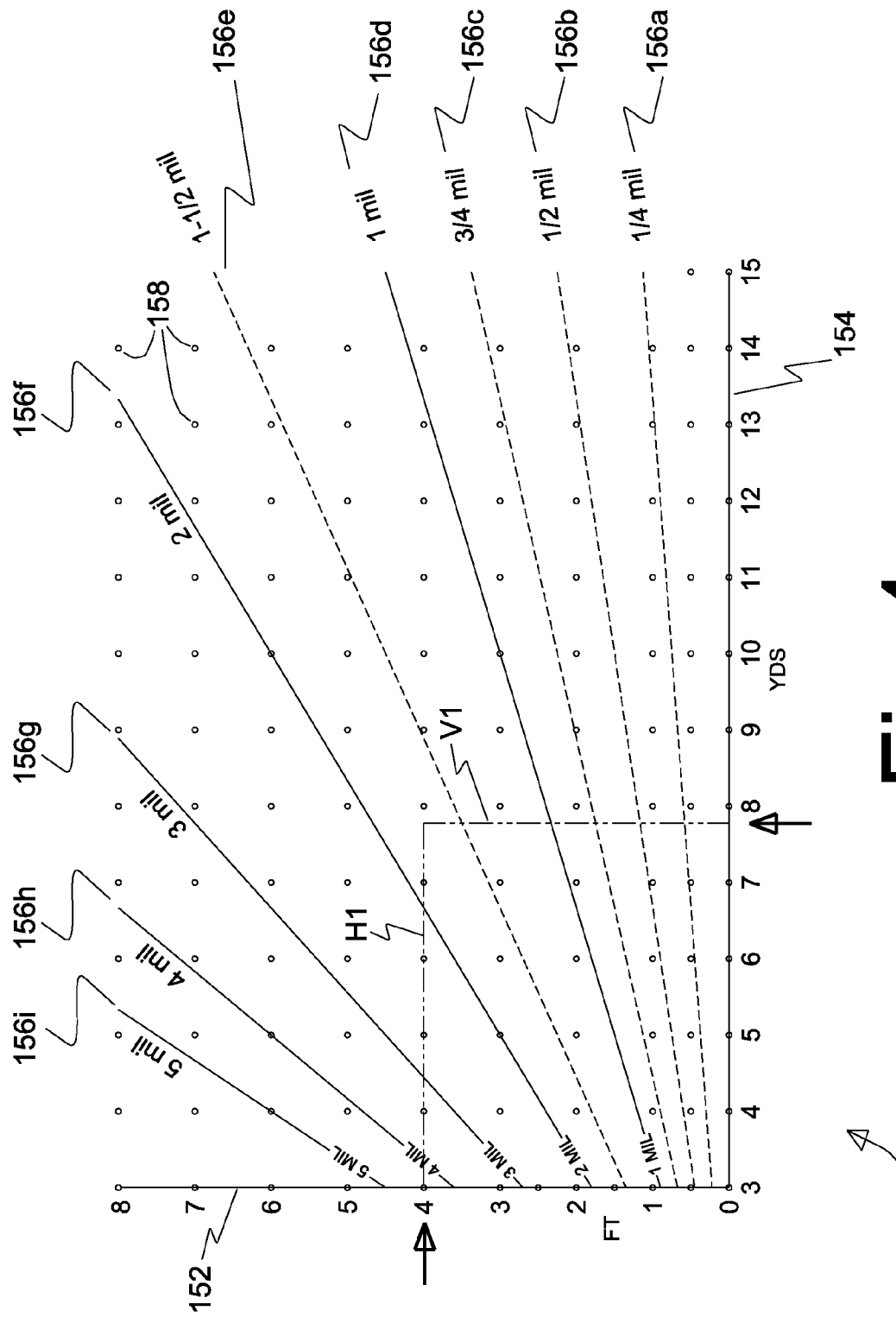
FIG. 4 is a detailed view of an angular dimension and target size vs. range distance nomograph according to some embodiments of the present invention.
Figure 5:
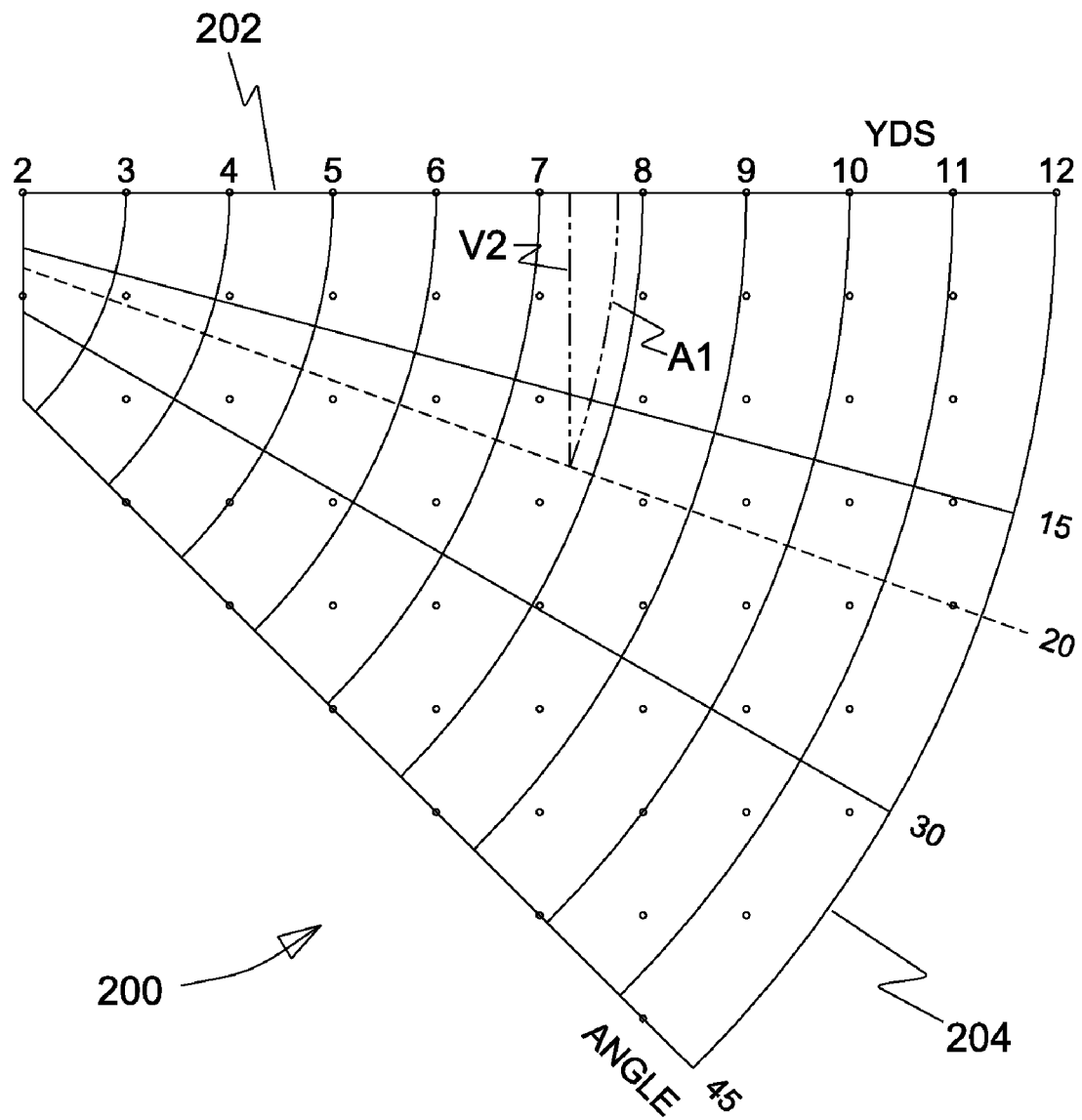
FIG. 5 is a nomograph for compensating for non-level slope between a firearm and a target according to some embodiments of the present invention.

The angular dimension and target size v. range distance nomograph 150 of FIG. 4 is used by first noting the height or span of the target or other object sighted. For example, the four foot tall fence post used as an example in the discussion of the angular measurement stadia 100 shown in FIG. 3 and discussed further above, along the vertical scale 152 along the left side of the nomograph. A horizontal line H1 is then visualized (or drawn) from that point along the vertical scale 152, until it intersects the appropriate sloped mil line equal to the number of mils subtended by the object. In the example of the fence post described further above, the post subtended an angle of 1¾ mils. Thus, one would extend the horizontal line H1 from the four foot point of the vertical scale 152 until it intersects a point about midway between the 1½ mil line and the 2 mil line. A vertical line V1 is then dropped from that point to intersect the horizontal range scale 154 to indicate the apparent range to the object and/or its adjacent target, i.e. about 770 yards in this example.

The vertical scale 152 of the nomograph 150 of FIG. 4 is marked in length or distance units of feet, with the horizontal scale 154 being marked in yards and the sloping lines 156a, etc. being in mils. It will be seen, however, that any linear distance systems may be used for the horizontal and vertical scales as desired, e.g. metric, etc. In a similar manner, any angular measurement system may be used for the sloping angular measurement lines of the nomograph 150, as desired. The only restriction is that the units used be consistent between different components of the present multiple nomograph system, as appropriate. In the case of the distance v. angular measurement nomograph 150 of FIG. 4, if it were to be calibrated e.g. using the metric system and minutes of angle (MOA), then the horizontal and vertical scales 102 and 104 of the angular measurement stadia 100 and the horizontal and vertical dot rows 60, 62, and 64 of FIG. 3 would require corresponding calibration in like units.

Once an apparent range to the target has been determined, the marksman or hunter must consider any difference in elevation (height) between the firearm and the target, and input a corresponding correction in his sight picture. The slope and wind correction nomograph 200 of FIG. 5 serves this purpose. Obviously, it is not possible for the hunter or marksman to check the elevation at the target, but he can measure at least approximately the slope (either up or down) between himself and the target. The slope/wind correction nomograph 200 includes a distance scale 202 in yards (or other units, as desired, so long as they are compatible with the distance units used in other charts and graphs) and an arcuate slope scale 204, below the distance scale.

The slope and wind correction nomograph 200 is used by first locating the apparent range to the target, e.g. 770 yards to continue the example initially developed further above, along the distance scale 202. An arcuate line A1 is then extended from the 770 yard point, parallel to the arcuate curves of the slope scale 204 until reaching the slope angle between the firearm and the target, e.g. twenty degrees. At this point, a vertical line V2 is extended upwardly from the bottom of the curved line A1 until reaching the horizontal scale 202, with the intersection of the vertical line V2 with the horizontal scale 202 indicating the horizontal distance from the firearm to the target, i.e. about 710 yards. It does not matter whether the slope is upward or downward, when using the nomograph 200 of FIG. 5 for determining the horizontal range. The correction used by the marksman is the same for any given degree of slope and slope distance, regardless of upward or downward slope.

The slope and wind correction nomograph 200 is quite useful for determining wind vectors as well, as indicated by its name. For example, a hunter may be facing a quartering 15 mph wind, coming from his left front at about a 45 degree angle. The hunter needs to know what the crosswind component is, so he can correct for windage. The hunter need only find the wind strength along the horizontal distance line 202, follow the arcuate curve 204 around to the 45 degree radial, and draw a line straight up from that point until intersecting the horizontal distance line 202 to find a crosswind component of between 10 and 11 mph.

Figure 6:
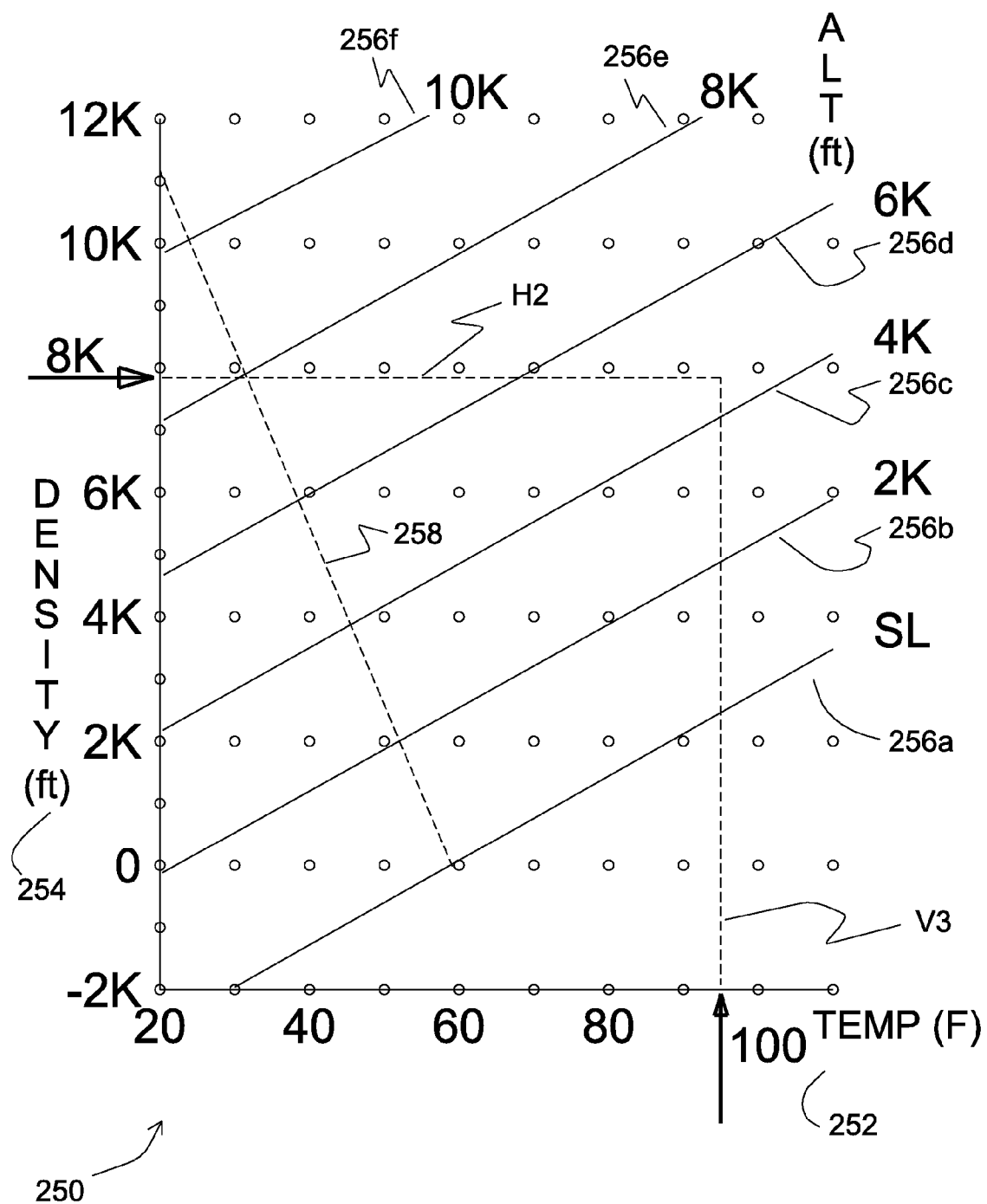
Figure 7A:
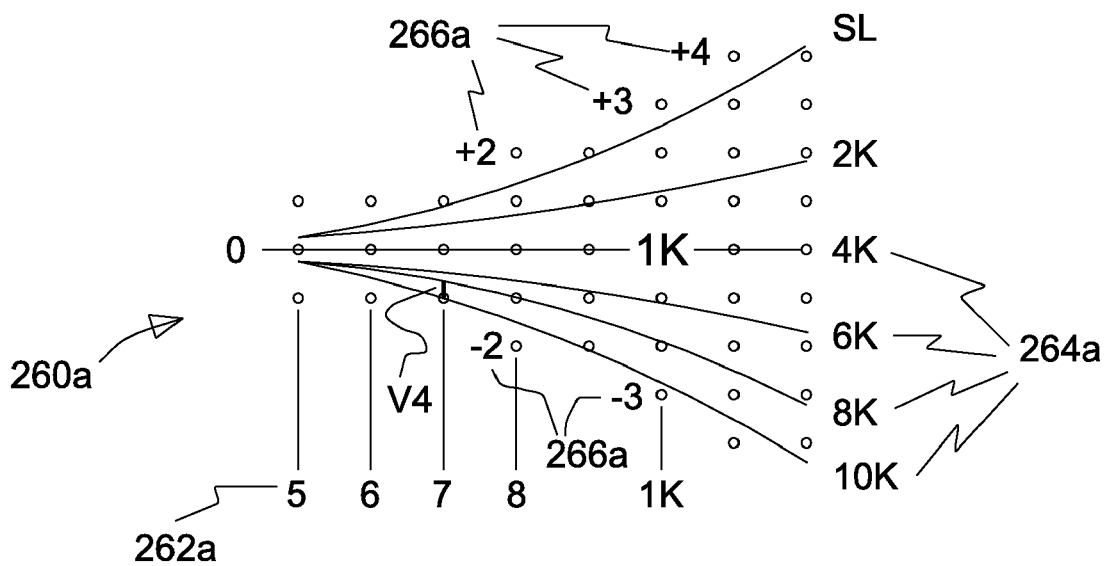
FIGS. 7A and 7B are detailed views of two nomographs for two different ranges, used to compensate the ballistics due to variations of density altitude, according to some embodiments of the present invention.
Figure 7B:
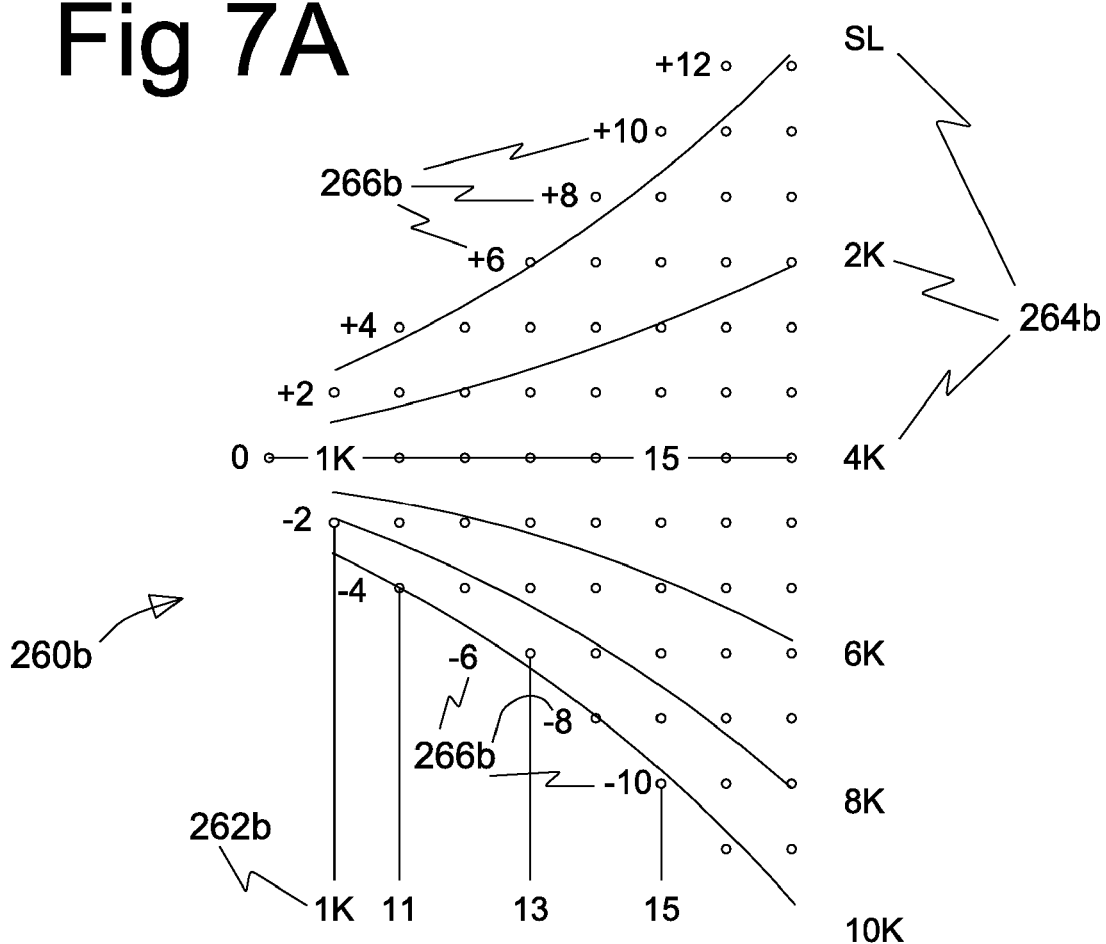

FIGS. 6 through 7B provide illustrations of a series of nomographs or charts used for determining the effects of density altitude upon the flight or trajectory of a bullet. Air density can have a measurable effect upon a bullet's or projectile's flight, particularly as the air density differs from uniformly accepted standards. As air density decreases with altitude, i.e. the air becomes thinner and less dense, the aerodynamic drag upon a bullet in flight decreases accordingly. This is particularly true in supersonic flight, which is practically all the useful flight trajectory of a projectile. However, air density is also affected by temperature, with warmer air being less dense, and barometric pressure changes, as well as the relatively minor effect of humidity.

The importance of atmospheric conditions upon the flight of a bullet or other projectile was recognized as far back as 1905 by the U.S. military. Obviously, some standard was needed to correct for non-standard conditions of temperature and pressure, so personnel would be able to input consistent corrections. Accordingly, the military settled on a standard temperature of 59 deg. Fahrenheit (15 deg. Celsius), a standard barometric pressure (corrected to sea level) of 29.53 inches of mercury, and a standard relative humidity of 78 percent. Since that time, the International Civil Aviation Organization (ICAO) has adopted the standards of 59 deg. Fahrenheit, 29.92 inches of mercury, and zero humidity, with these ICAO standards being adopted by the U.S. military in the early 1960s. Sport shooters and hunters adapted the old U.S. military system in the early part of the twentieth century, however, and continue to use that system today for ballistics calibration. The specific standard used is not critical, so long as the atmospheric modeling system remains consistent throughout.

The inventor has developed certain methods for converting between the older U.S. military standard atmosphere to the ICAO standard atmosphere, to use data provided by various electronic devices available (e.g., the Kestrel 4000, an electronic anemometer and barometric pressure and temperature sensing device). An exact comparison of the two standards is beyond the scope of this document, but briefly there is an elevation difference (at equal density) ranging from about 600 feet at sea level, up to a difference of a bit less than one thousand feet at an altitude of ten thousand feet, between the older U.S. military standard atmosphere and the ICAO standard atmosphere. A major part of this difference, i.e. approximately four hundred feet, is mostly due to the difference in standard barometric pressures between the two standards. The balance is mostly due to the differences in modeling between the two standard atmospheres.

FIG. 6 provides an illustration of an ICAO density altitude determination chart 250. The chart 250 includes a temperature scale 252 along the lower edge, and a density altitude scale 254 along the left vertical edge. A series of sloping elevation lines 256a, 256b, 256c, etc. extend across the chart 250, and represent the pressure altitude (i.e., altitude corrected for non-standard pressure, but not for other factors) along those lines. A dashed line 258 representing standard temperature (and clearly indicating the decrease in standard temperature with altitude) is also shown across the graph or chart 250.

The density altitude determination chart 250 is used by first finding the actual temperature (in degrees Fahrenheit, although the chart 250 could include a Celsius scale, if so desired) along the horizontal scale 252, then forming a vertical line V3 from the temperature scale 252 upwardly until it intersects the appropriate elevation line (pressure altitude), e.g. 256c, 256d, etc. At that point, a horizontal line H2 is drawn to intersect the density altitude scale 254, to find the density altitude. As an example of the above, if the temperature is 95 deg. Fahrenheit at a pressure altitude of 4200 feet, one begins at the 95 deg. point along the temperature scale 252 and forms the line V3, extending upwardly to a point about one fifth of the way between the four thousand foot and five thousand foot pressure altitude lines 256c and 256d. A horizontal line H2 is formed from that point, to the left to intersect the density altitude scale at about the eight thousand foot point.

FIG. 6B illustrates an improved density altitude determination graph that accounts for humidity. Lines 256a, 256b, etc. represent elevation lines at 0% RH (relative humidity), while corresponding lines 257a, 257b, etc. represent the same elevation at 100% RH. The vertical difference between lines 256a and 257a at a given temperature represents the effect on the density altitude of a humidity change from 0% to 100%. This advantageously enables a user who has a reasonable value for the RH at his location to factor this variable into his density altitude determination.

Similarly to FIG. 6, a user starts at a known temperature. In the example shown in FIG. 6B, 90 degrees F, and then moves vertically upwards along line V3 until reaching an appropriate elevation line. In this instance, the line for Sea Level elevation is line 256a. If humidity is low, the user now traverses leftwards along line H2 to scale 254 and reads the density altitude to be 2K or 2000 ft. If the humidity is high, close to 100%, the user would continue up line V3 until reaching line 257a representing Sea Level elevation but with 100% RH. Then, at this point the user can traverse left along line H3 to read the density altitude on scale 254 at approximately 2700 ft. For an intermediate relative humidity value, the user visually interpolates the RH value between the lines 256a and 257a before traversing left to read the density altitude on scale 254.

As well as accounting for humidity, FIG. 6B incorporates another advantageous feature that helps readability of any graph in a scope reticle. This improvement generally comprises easy to see dots and numbers corresponding to rows and columns of landmark values on axes 252 and 254. The numbers represent landmark values of density altitude. This feature alleviates the necessity of traversing horizontally to the scale 254 in all cases. It is usually possible for a user to read his value at the top of line V3. This improvement is of utility in any graphical entity in a scope reticle, not simply this DA graph.

The above described procedure is standard for determining density altitude for virtually any purpose, e.g. aircraft performance in aviation, etc. It, however, does not define the ballistic performance of a firearm bullet or projectile. To determine such ballistic performance, additional factors must be considered. FIGS. 7A and 7B provide a pair of density altitude ballistic correction charts or nomographs, respectively 260a for target distances ranging from about 500 yards to about 1200 yards, and 260b for target distances ranging from about one thousand yards to about 1700 yards. Each nomograph 260a and 260b includes a horizontal range scale, respectively 262a and 262b, and a series of curves 264a, 264b representing the density altitude. Each nomograph 260a, 260b also includes a series of positive and negative "minute of angle" or MOA correction factors 266a, 266b, represented by a series of horizontal rows of dots. Other correction factors or scales, e.g. the mil system, etc., may be used as desired.

As the previously calculated horizontal range to the target is about 710 yards in the ongoing example, the shorter range nomograph 260a will be used for this final calculation. First, the horizontal range is located along the lower horizontal range scale 262a. The "7" line is appropriate for this calculation, as a ten yard range difference does not noticeably affect the MOA correction factor in this calculation. One then follows (or forms) the selected vertical line, e.g. line V4 representing the seven hundred yard range mark on the nomograph 260a, upwardly until it reaches the curve 264a for the previously determined density altitude, e.g. eight thousand feet. This intersection point is about three quarters of the way between the horizontal zero correction line and the first MOA dot line immediately below, thus indicating a negative minute of angle or MOA correction of about ¾. The correction is negative due to the relatively high density altitude and correspondingly thinner air, resulting in less aerodynamic drag on the bullet and the corresponding need to aim slightly low due to the smaller amount of bullet drop. The marksman applies this ¾ MOA correction to the scope sight field, to arrive at a final aiming point for his target. This may be accomplished by means of conventional elevation adjustment for the reticle of the firearm scope, or alternatively the marksman may compare the needed MOA correction with a comparable angle subtended by a known span or height at the range of the target, and adjust his aim accordingly.

Figure 8:
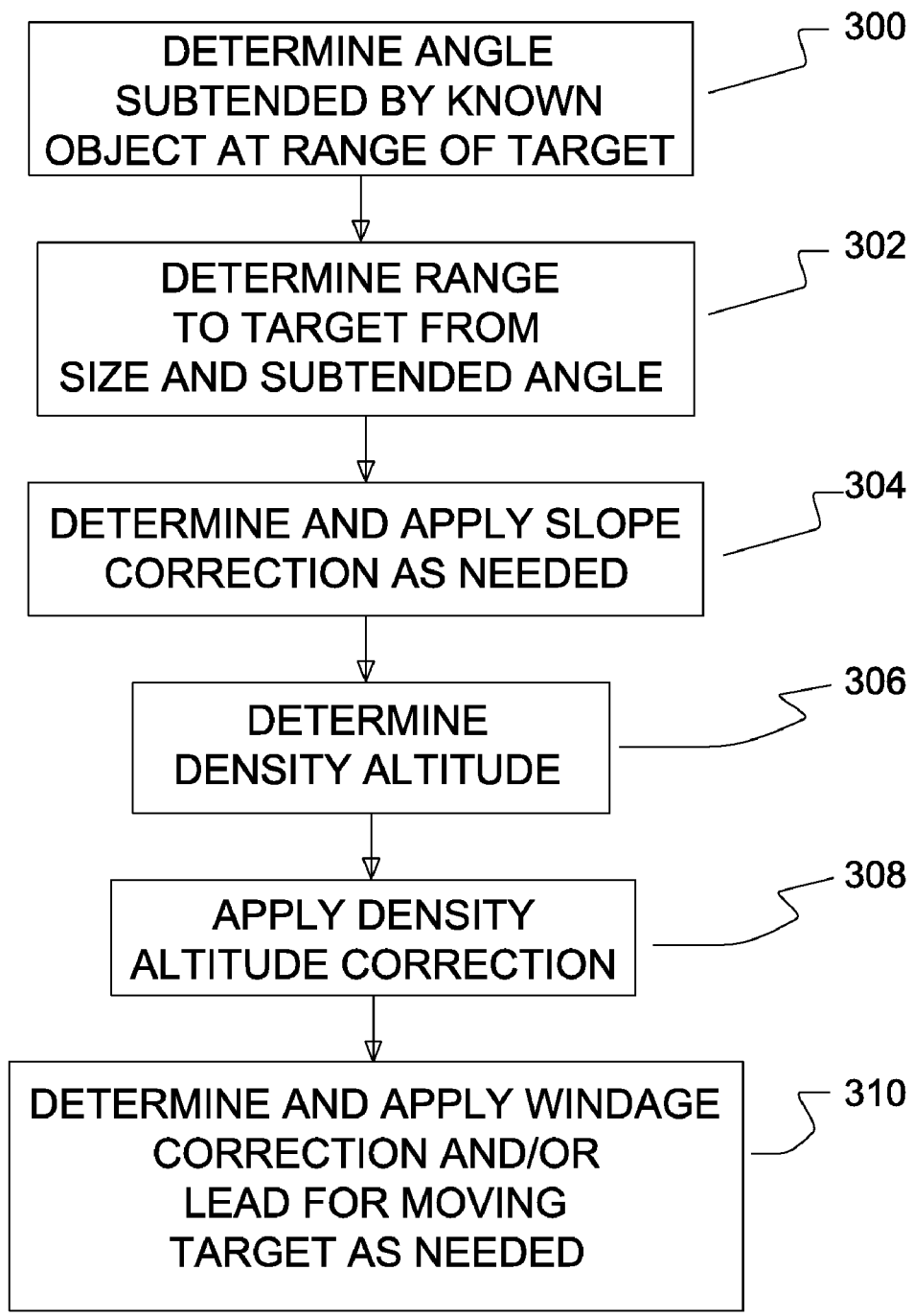
FIG. 8 is a flow chart illustrating steps according to a method of using a multiple nomograph system according to some embodiments of the present invention.

FIG. 8 provides a flow chart summarizing the above procedure. Initially, the marksman or hunter measures the angle subtended by the target (or object of known size adjacent to the target) using the horizontal or vertical angle measurement stadia 100 (shown with the elevation and windage aim point field of FIG. 3), generally as indicated by the first step 300 of FIG. 8. Once the angle (mils, MOA, etc.) is known, the hunter or marksman applies this information to the distance v. angular measurement nomograph of FIG. 4, which may be located within the scope reticle or externally to the reticle field. This step is generally indicated as the second step 302 of FIG. 8.

At this point, the marksman must apply any correction for elevation difference (if any) between the firearm and the target, generally as indicated by the third step 304 of FIG. 8. This is accomplished by means of the slope and wind correction nomograph 200, shown in detail in FIG. 5. The shooter may also use this nomograph to determine the crosswind component for any wind blowing across the range between the firearm and target, as explained further above.

Correction for non-standard atmospheric conditions is applied at this point, generally as indicated by the fourth and fifth steps 306 and 308 of FIG. 8. First, the marksman must determine the density altitude. This may be accomplished by means of an electronic device, if the shooter is so equipped, or by means of various types of simple slide rule type calculators, e.g. the "denalt" (density altitude) calculator widely known in aviation. If no such device is available, the shooter may use the density altitude determination nomograph or chart 250, shown in detail in FIG. 6 and FIG. 6B. Once the density altitude has been determined, the shooter applies the density altitude to the selected one of the ballistic correction nomographs 260a or 260b respectively of FIGS. 7A and 7B, depending upon the previously determined distance to the target. At this point, the hunter or marksman may apply the correction(s) derived in accordance with the above steps to the elevation and windage aim point field 50 as viewed through the scope reticle of FIG. 2, along with any windage and/or moving target lead correction needed, generally in accordance with the final step 310 of FIG. 8, to arrive at an accurate aim point for the target.

Figure 9:
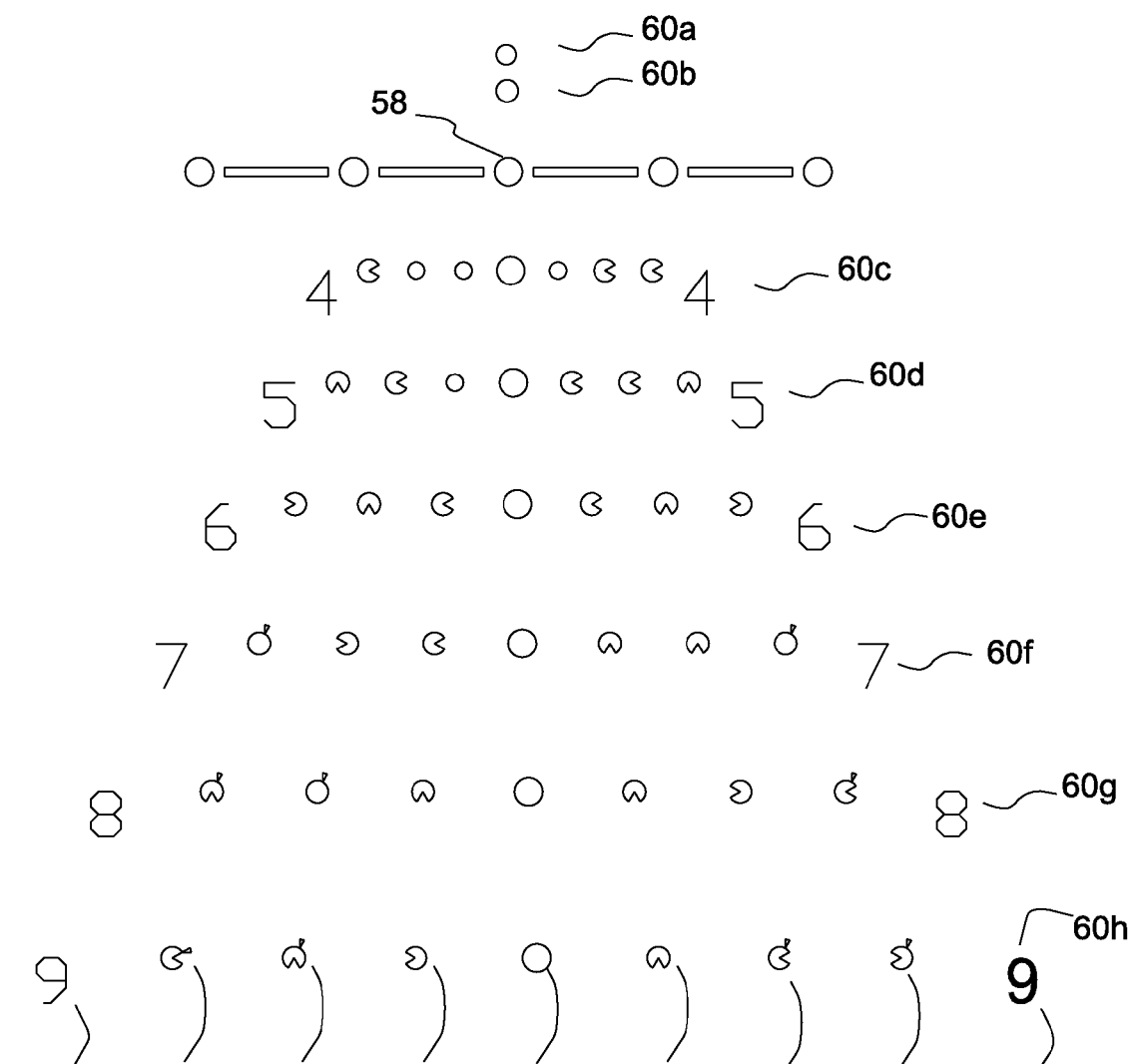
FIG. 9 is a detailed view of a target aiming field or dot pattern in which density altitude ballistic corrections are encoded into the windage dots used in accordance with some embodiments of the present multiple nomograph invention.

FIG. 9 is a detailed view of a target aiming field or dot pattern and apparent target angular dimension stadia placed on a scope reticle and used in accordance with some embodiments of the present multiple nomograph invention. It is similar to the aim point field 50 of FIG. 3. As shown, the aiming field includes various dot indicia having various shapes. The various shapes can be used to encode density altitude ballistic compensation into the dots as an alternative for the nomograph(s) shown and discussed in FIG. 7A and FIG. 7B. In the particular illustrated embodiment, the DA compensation data is encoded into windage dots of the aiming field.

Figure 10:
FIG. 10 illustrates various samples of dot patterns used to encode density altitude data into a dot pattern according to some embodiments of the present invention.
Figure 10:
Figure 10:
Figure 10:
Figure 10:
Figure 10:
Figure 10:
Figure 10:
Figure 10:
Figure 10:
Figure 10:
Figure 10:

FIG. 10 illustrates various samples of dot patterns used to encode density altitude ballistic correction data into a dot pattern according to some embodiments of the present invention. As shown, FIGS. 9 and 10 show full circles and fractional circles as windage compensation dots. Fractional portions display a pie slice portion removed from a round dot. The removed pie slice portion can be equated to a minute hand of a clock. If a pie slice points to a 3 o'clock position (FIG. 10A) this equates to one quarter past the hour and signifies ¼ MOA adjustment. Similarly, when a slice points to 6 o'clock (FIG. 10B) it is ½ MOA adjustment, and when a slice points to 9 o'clock (FIG. 10C), it represents ¾ MOA adjustment.

This same approach can be used for integer quantities. For example, utilizing a small mark outside a windage dot body can be used to signify an hour hand on a clock. As an example, this is shown in FIG. 10D representing one MOA adjustment thru FIG. 10I representing a six MOA adjustment. The rest of a clock face thru 12:00 can also be positioned in a similar manner.

In use, both integer and fractional amounts can be combined so these are combined to provide DA ballistic compensation information. Examples are shown in FIG. 10J equaling 1¼ MOA adjustment, FIG. 10K=2½ MOA adjustment, and FIG. 10L=4¾ MOA adjustment.

In FIG. 9, each column of windage dots can represent a specific DA. The windage dots in this example are set up for 5 mph increments of windage. Column 54 is the no wind dot, and columns 62a and 64a represent a 5 mph windage, etc.

In most situations the DA will fall between −4000 ft and +12,000 under various temperatures and elevations. A central value near 4000 ft DA is currently envisioned as a good baseline at which to fix the primary rows of drop dots (60a, 60b, 58, 60c, etc.) for desired range distances. Thus, when the DA varies from this central value is it necessary to adjust the scope (or hold over/under the target). As shown in FIG. 9, the reticle portion has 3 windage dots to each side of the central column of dots, 54. If the far left column, 62c, represents −2000 ft DA, then going right to the next column (62b) represents 0 ft DA, the next column (62a) is 2000 ft DA, and thus the central row represents 4000 ft DA. As such, the next rows to the right can represent 6000 ft DA (64a), 8000 ft DA (64b), and 10000 ft DA (64c), respectively.

To further illustrate usage of DA compensation encoded windage dots, the inventor provides the following examples. Supposing a DA is 10,000 ft and we must make a 900 yard shot. To do so, find the row of dots labeled '9' in FIG. 9 (row 60h), and then go to the far right dot (column 64c) whose column represents 10,000 ft DA. Reading the value of the encoded dot we see it represents 1¾ MOA. Because the shot is being taken at a higher DA, the air is thinner and the bullet will fly flatter than the row of dots are set up for. This means the scope must be adjusted downwards by this amount or hold this much below the target. Similarly, for a 900 yard shot at sea level DA, one can look at the second dot from the left, column 62b, on the row labeled '9', row 60h, and see it represents 1½ MOA. Since this is a lower DA the adjustment should be the UP direction.

As is apparent, this method of encoding DA based ballistic compensations replaces the nomographs of FIG. 7 and thus offers less clutter in the reticle. It also allows the shooter to get the data he needs quicker than making his eye traverse to another graph and then reading said graph.

It should be understood that there are other specific means to convey DA compensation information other than outlined above. As an example, certain other embodiments can utilize encoding the information with a familiar methodology such as the above discussed clock face. As another example, a chart of numbers showing the adjustment as a function of range and DA could be utilized.

In conclusion, embodiments of the present invention provide systems for solving ranging and ballistic problems in firearms provides the serious marksman with a non-electronic means of solving all of the most critical problems or factors affecting the accuracy of a shot once the bullet leaves the muzzle of the firearm. It is anticipated that many shooters will use electronic devices to determine density altitude, crosswind component, and perhaps other factors, but where such electronic means are not available, e.g. due to prohibition in competition or malfunction of the device, the present non-electronic nomograph system will provide an extremely accurate method of resolving the various factors which affect the accuracy of a shot. Moreover, the present system may be incorporated entirely within the reticle of a firearm scope, if so desired, thus allowing the marksman to keep his eye on the target at all times. Many of the various nomographs which are not critical for aiming per se, e.g. density altitude, slope, etc., may be provided alternatively by means of some other media, e.g. plastic or paper, or disposed within a spotter scope, etc., as desired. Accordingly, embodiments of the present multiple nomograph system will provide all serious shooters with the means to resolve all of the most critical factors affecting the trajectory of a bullet, and thus consistently produce extremely accurate shots at virtually any practicable range.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

I claim:

1. A system to solve ranging and ballistic compensation problems in firearms at various range-distances under varying atmospheric conditions, the system comprising:
    a reticle housed within a firearm scope; and
    ballistic compensation information associated with at least one of the reticle and an aimpoint adjustment feature of the firearm such that a user can utilize the ballistic compensation information to compensate for various density altitude levels to adjust the firearm scope, wherein the ballistic compensation information is indexed by density altitude level to enable adjustment of the firearm scope to adjust for varying atmospheric conditions and range distances.

2. The system of claim 1, the ballistic compensation information being encoded into markings disposed on the reticle.

3. The system of claim 1, the ballistic compensation information being disposed at least one of internally or externally of the firearm scope reticle.

4. The system of claim 1, further comprising a target size and angular measurement versus range distance nomograph, corresponding to horizontal and vertical angular measurement stadia disposed on the reticle of the firearm scope.

5. The system of claim 4, wherein at least one of the target size and angular measurement versus range distance nomograph and the ballistic compensation information is disposed externally to the firearm scope reticle.

6. The system of claim 1, further comprising a density altitude determination chart and at least one density altitude ballistic correction nomograph to contain density altitude information.

7. A system to adjust the point of aim of firearms under varying atmospheric conditions, the system comprising:
    a reticle disposed within a firearm scope;
    a plurality of aiming points disposed upon said reticle, said plurality of aiming points positioned for proper aim at various predetermined range-distances and wind conditions, wherein all of said predetermined range-distances and wind conditions are all based upon a baseline atmospheric condition;
    a means for determining existing density altitude characteristics, said means for determining existing density altitude characteristics being disposed on said reticle or external to said reticle; and
    ballistic compensation information indexed by density altitude criteria configured to be provided to a rifleman such that the rifleman can compensate or adjust an aim point to account for an atmospheric difference between the baseline atmospheric condition and an actual atmospheric condition, wherein ballistic compensation information is based on and indexed according to density altitude to characterize the actual atmospheric condition.

8. The system of claim 7, wherein the ballistic compensation information is encoded into the plurality of aiming points disposed upon said reticle.

9. The system of claim 7, further comprising indicia being disposed upon the reticle and wherein ballistic compensation information is encoded into the indicia.

10. The system of claim 7, wherein the ballistic compensation information is positioned external to the reticle.

11. The system of claim 7, wherein the ballistic compensation information is encoded into the plurality of aiming points disposed upon said reticle, wherein the encoding is done via display of an encoding scheme that comprises a combination of full circles, fractional circles, and tick marks being displayed on said reticle.

12. A method to solve trajectory compensation problems associated with firearms by providing a user with ballistic compensation information to allow the user to adjust one or more aiming points based on existing density altitude characteristics, the method comprising:

providing ballistic compensation information as a function of and indexed according to density altitude for presentation to a user of a firearm; and associating said ballistic compensation information with at least one of, a firearm scope reticle and scope adjustment features, to enable a user to compensate for existing density altitude levels to adjust one or more aiming points displayed on the firearm scope reticle.

13. The method of claim 12, wherein the ballistic compensation information is encoded into markings disposed on the reticle of the scope via an encoding scheme.

14. The method of claim 12, wherein the ballistic compensation information is graphed, or tabulated into markings disposed on the reticle of the scope.

15. The method of claim 12, wherein the ballistic compensation information comprises density altitude determination data and a ballistic correction chart indexed by density altitude.

16. The method of claim 12, wherein the ballistic compensation information is disposed externally to the reticle.

* * * * *